United States Patent [19]

Plummer

[11] Patent Number: 4,589,745
[45] Date of Patent: May 20, 1986

[54] GEOMETRIC LED LAYOUT FOR LINE EXPOSURE

[75] Inventor: William T. Plummer, Concord, Mass.

[73] Assignee: Polaroid Corporation, Cambridge, Mass.

[21] Appl. No.: 695,072

[22] Filed: Jan. 25, 1985

[51] Int. Cl.[4] ............................................. G03B 41/00
[52] U.S. Cl. .......................................... 354/4; 250/553
[58] Field of Search ................. 354/4, 5; 346/107 R; 250/553; 340/762, 782; 178/15, 30

[56] References Cited

U.S. PATENT DOCUMENTS

| | | | |
|---|---|---|---|
| 4,090,206 | 5/1978 | Pfeifer et al. | 346/107 R |
| 4,096,486 | 6/1978 | Pfeifer et al. | 346/107 R |
| 4,198,158 | 4/1980 | Knowlton | 355/54 |
| 4,229,086 | 10/1980 | Beery et al. | 354/5 |
| 4,318,597 | 3/1982 | Kotani et al. | 354/5 |
| 4,378,149 | 3/1983 | Ebner | 354/5 |
| 4,435,064 | 3/1984 | Tsukada et al. | 355/1 |
| 4,447,126 | 5/1984 | Heidrich et al. | 354/5 X |
| 4,455,100 | 6/1984 | Bauer | 400/88 |
| 4,455,562 | 6/1984 | Dolan et al. | 346/154 |
| 4,455,578 | 6/1984 | Fearnside | 358/302 |

*Primary Examiner*—William B. Perkey
*Attorney, Agent, or Firm*—Edward S. Roman

[57] ABSTRACT

A line exposure array of light emitting diodes arranged in spaced apart relationship with respect to each other along the longitudinal axis thereof and geometrically configured to provide a substantially uniform exposure of a photosensitive material without underexposed stripes appearing on those areas of the photosensitive material immediately adjacent the spaces between the light emitting diodes.

10 Claims, 8 Drawing Figures

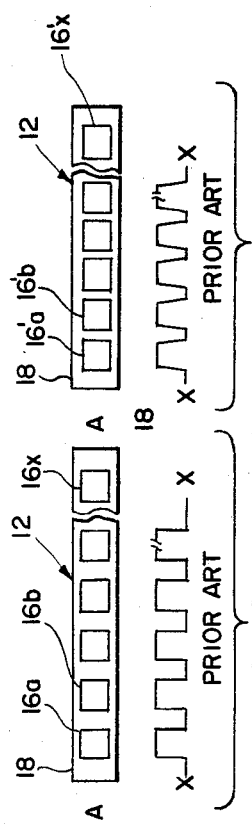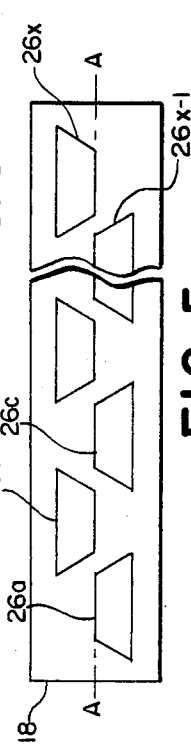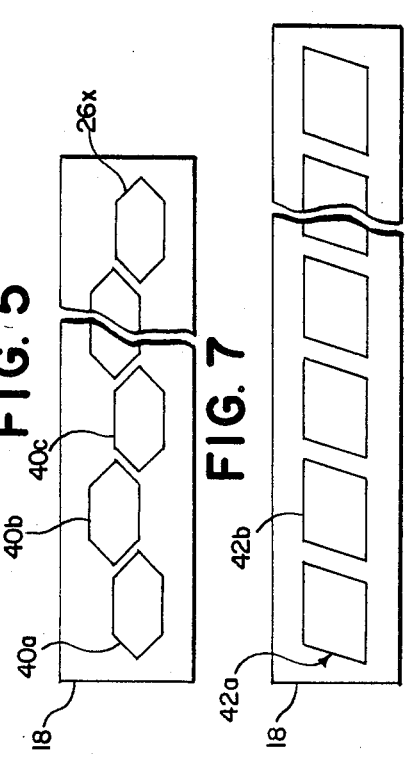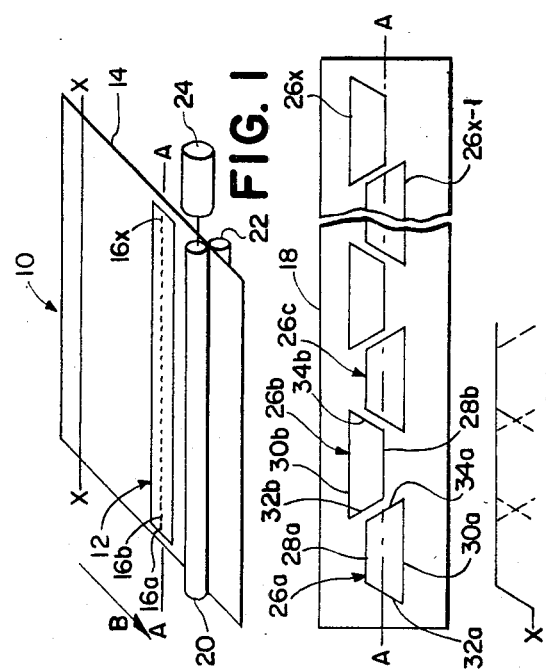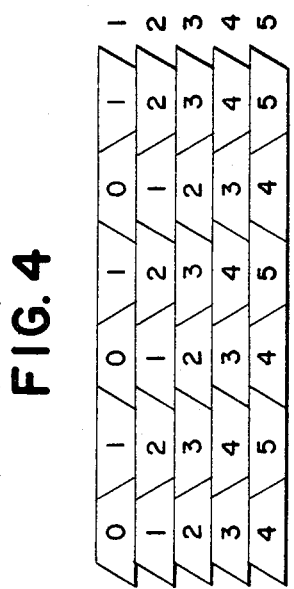

GEOMETRIC LED LAYOUT FOR LINE EXPOSURE

BACKGROUND OF THE INVENTION

1. Field of the Invention

This invention relates generally to the geometric layout for the light emitting diodes of a line exposure array and, more particularly, to a line exposure array of light emitting diodes geometrically configured to line scan and uniformly expose a photosensitive material.

2. Description of the Prior Art

Electronic image recording apparatus of a type comprising a line exposure array stationed in light exposing relationship to a photosensitive material and comprising a plurality of linearly spaced apart light emitting diodes are well known in the art. Means are generally provided for effecting a relative displacement between the light exposure array and the photosensitive material in a direction transverse to the longitudinal axis of the exposure array so as to affect an exposure of the entire surface of the photosensitive material.

Line exposure arrays of the aforementioned type comprising a plurality of light emitting diodes aligned in spaced apart relation along the longitudinal axis thereof generally provide for a nonuniform line exposure as a result of those portions of the photosensitive material immediately opposite the areas between the light emitting diodes receiving substantially less exposure than those areas of the photosensitive material immediately opposite the light emitting diodes. This nonuniform line exposure results in visible underexposed stripes extending across the photosensitive material in the direction of relative displacement between the photosensitive material and the line exposure array. The visibility of such stripes can be reduced but not entirely eliminated by minimizing the spacing between the light emitting diodes. The degree to which the spacing between the light emitting diodes can be minimized, however, is limited by practical constraints since adjacent light emitting diodes must also be insulated from each other. This insulation requirement results in a minimum degree of spacing between the light emitting diodes being required thereby making it impossible to entirely eliminate some minimum degree of spacing between the diodes. In addition, as the spacing between the light emitting diodes is decreased, the light intensity at the adjacent edges of the diodes tends to roll off and create in effect adjacent dead zones. Such dead zones also operate to underexpose those regions of the photosensitive material immediately adjacent thereto. The dead zones could be eliminated by using lenses to defocus the light emitting diodes; however, such an approach leads to unnecessary picture blurring and inefficient use of the brightness available from the light emitting diodes.

Other methods for eliminating the underexposed stripes resulting from the spaced apart light emitting diode configuration of a line exposure array have involved mechanical mechanisms for vibrating or oscillating the line exposure arrays in directions parallel to the longitudinal axis of the line exposure array. Such oscillations are generally limited to moving each light emitting diode a limited distance equivalent to the distances between which the light emitting diodes are spaced apart. While such systems can satisfactorily provide a uniform line exposure from a linear array of spaced apart light emitting diodes, there is added a substantial degree of mechanical complexity, cost and size with an attendant decrease in reliability.

Therefore, it is a primary object of this invention to provide a line exposure array of spaced apart light emitting diodes geometrically configured to uniformly expose the photosensitive material without mechanical vibration and its attendant complexity and cost.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

A line exposure array comprises an elongated substrate and a plurality of light emitting elements disposed in spaced apart relationship along the longitudinal axis of the substrate. Each of the light emitting elements is defined by two substantially parallel spaced apart edge lines extending generally in directions parallel to the longitudinal axis of the substrate and interconnected at respective ends thereof by skewed edge lines extending in directions generally oblique to the longitudinal axis of the substrate. The light emitting elements preferably comprise light emitting diodes wherein at least portions of the skewed edge lines of adjacent light emitting diodes are arranged in substantially parallel relationship with respect to each other. The edge lines of each of the light emitting diodes are preferably structured to define a trapezoid.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 1 is a perspective view of an electronic image recording apparatus embodying the line exposure array of this invention;

FIG. 2 is a top plan view of a portion of a conventional line exposure array comprising a plurality of spaced apart light emitting diodes;

FIG. 3 is a top plan view of a portion of another arrangement for a conventional line exposure array comprising a plurality of spaced apart light emitting diodes;

FIG. 4 is a top plan view of a portion of a line exposure array embodying a plurality of spaced apart light emitting diodes geometrically configured in the manner of this invention including a graphical representation of the integrated light intensity provided by the line exposure array;

FIG. 5 is a top plan view of a portion of an alternate embodiment for the line exposure array of FIG. 4;

FIG. 6 is a diagrammatic representation of a portion of a photosensitive material exposed by the line exposure array of FIG. 5;

FIG. 7 is a top plan view of a portion of still another embodiment of the line exposure array of FIG. 4; and FIG. 8 is a top plan view of a portion of still another embodiment for the line exposure array of FIG. 4.

DESCRIPTION OF THE PREFERRED EMBODIMENT

Referring now to FIG. 1, there is shown generally at 10 an electronic image recording apparatus for exposing a photosensitive material to an image derived from an electrical signal. The image recording apparatus 10 comprises a line exposure array 12 stationed in light exposing relationship to a photosensitive material 14. The line exposure array 12 comprises a plurality of linearly spaced apart light emitting image defining elements 16a through 16x. Each of the light emitting elements 16a through 16x preferably comprises a solid state device whose electroluminescent output is dependent upon electrical input thereto such as a light emitting diode. Light emitting diodes are solid state devices which change electrical energy directly into light energy without passing through an intermediate thermal stage as is characteristic of incandescent lamps thereby resulting in an extremely fast response to current change and an immunity to shock and vibration which makes them preferable for the purposes of this invention. The light emitting elements 16a through 16x may be maintained in such spaced apart relation with respect to each other by connection to a substrate 18 in a manner as is well known in the art.

The photosensitive material 14 may be advanced in a direction of the arrow B by a pair of drive rollers 20 and 22 rotatably driven by a motor 24 which could be either of a continuous drive type or a stepper drive type. The light emitting elements 16a through 16x are selectively energized or driven by either analog or digital signals in a well-known manner as the line exposure array 12 scans across the photosensitive material 14 when the photosensitive material 14 is driven by the rollers 20 and 22 in the direction of the arrow B. The energization of the light emitting elements 16a through 16x may be sequenced in correspondence with the energization of a stepper-type motor 24 to expose a line, one example of which is shown at xx, across the photosensitive material 14 for each incremental rotation of the motor 24 in a step and repeat manner as is well known in the art and described in U.S. Pat. No. 4,378,149, entitled "High Speed, Low-Cost Character Printer", by Peter R. Ebner, issued Mar. 29, 1983 and U.S. Pat. No. 4,090,206, entitled "Method and Apparatus for Producing Successive Lines of Image Points on a Recording Medium", by Josef Pfeifer et al., issued May 16, 1978, both of which patents are now incorporated by reference herein. Thus, for those embodiments where the motor 24 is of the stepper-type drive, the light emitting diodes 16a through 16x will be energized at each incremental step advancement of the motor 24 to expose a succession of spaced apart lines across the photosensitive material 14, one example of which is shown by the line xx.

Conversely, if the motor 24 is of the continuous drive type and the light emitting diodes 16a through 16x are energized for a finite time for each successive line exposure during the continuous advancement of the photosensitive material 14 therepast, each line, such as that shown at xx, exposed on the photosensitive material 14 during each successive finite exposure time of the array 12 will become slightly blurred. This slight blurring is not objectionable and may in fact be effective in substantially eliminating the stripes that are sometimes visible on the exposed photosensitive material 14 as a result of underexposing the areas between succeeding raster lines when the film is incrementally moved and stopped for each succeeding line exposure with a stepper motor.

Referring now to FIG. 2 there is shown an enlargement of a portion of the line exposure array 12 comprising a plurality of generally rectangular shaped light emitting diodes 16a through 16x as is well known in the art. Immediately below the line exposure array 12 of FIG. 2 there is shown a graphical representation of the integration of light intensity from the line exposure array 12 along the line xx as the photosensitive material 14 is moved under the exposure array 12. Assuming that the light emitting diodes 16a through 16x are uniformly energized it can be seen that the integrated light intensity is highly nonuniform with the integrated light intensity immediately opposite the areas between the light emitting diodes being substantially less than the integrated light intensity immediately opposite the light emitting diodes. Such nonuniformity in integrated light intensity can result in visible underexposed stripes extending across the photosensitive material in the direction of movement of the photosensitive material 14 as shown by the arrow B.

One attempt to minimize such stripes involves minimizing the distances between the light emitting diodes 16a through 16x as shown in FIG. 3. Below the line exposure array 12 of FIG. 3 there is again shown a graphical representation of the integrated light intensity occurring along the line xx as the photosensitive material 14 is moved under the exposure array 12. Although the underexposed stripes would now appear to be narrower than for the example shown in FIG. 2, they still cannot be entirely eliminated because adjacent light emitting diodes must be insulated from each other thereby resulting in some minimum degree of spacing. In addition as the spacing between the light emitting diodes 16a through 16x is decreased, the light intensity at the adjacent edges of the diodes tends to roll off creating in effect adjacent dead zones. Such dead zones are manifested in the graphical representation of the integrated light intensity of FIG. 3 by the more gradual drop off in integrated light intensity in the valleys between the peaks in comparison with the steep or vertical drop off in integrated light intensity in the graph of FIG. 2. Thus, spacing the light emitting diodes as close as practical still cannot entirely eliminate the underexposed visible stripes along the areas of the photosensitive material 14 immediately adjacent the spaces between the light emitting diodes 16a through 16x.

Referring now to FIG. 4 there is shown the preferred geometric layout for the light emitting diodes of this invention as shown at 26a through 26x. It will again be well understood that only a portion of the line exposure array is illustrated in FIG. 4. The light emitting diodes 26a through 26x are preferably configured in the shape of a trapezoid, the first diode of which as shown at 26a is defined by two substantially parallel spaced apart edge lines 28a and 30a extending generally in directions parallel to the longitudinal axis of the substrate 18 as illustrated by the phantom line AA and interconnected at respective ends thereof by skewed edge lines 32a and 34a extending in directions generally oblique to the longitudinal axis AA of the substrate 18. The next adjacent light emitting diode as shown at 26b is inverted with respect to the trapezoidal shape of the light emitting diode 26a and defined by two substantially parallel spaced apart edge lines 26b and 28b extending generally in directions parallel to the longitudinal axis A of the substrate 18 and interconnected at respective ends thereof by skewed edge lines 32b and 34b extending in directions generally oblique to the longitudinal axis A of the substrate 18. This pattern is thereafter continuously repeated for the entire length of the line exposure array. As is readily apparent, the skewed edge lines such as those shown at 34a and 34b of adjacent light emitting diodes 26a and 26b are arranged in substantially parallel spaced apart relation with respect to each other. It is also apparent that alternate light emitting diodes are offset with respect to their immediately adjacent diodes by a selected distance in a direction orthogonal to the longitudinal center axis A of the substrate 18. The energization of each row of offset diodes could be delayed with respect to each other in a well-known manner to compensate for this offset. Conversely, if the offset between alternate diodes is not great as shown in FIG. 4, then all of the diodes can be energized simultaneously resulting in a slight blur to the line exposed on the photosensitive material 14.

FIG. 4 also shows the graphical illustration for the integration of light intensity along the line xx as the photosensitive material 14 is moved under the line exposure array 12. As is readily apparent, the integration of light intensity is substantially uniform as shown by the solid line with each diode's contribution being delineated by phantom lines. Thus, the trapezoidal configuration of the light emitting diodes of this invention operates to provide a substantially uniform line exposure eliminating the striping which otherwise would occur from conventional light emitting diode line exposure arrays as shown in FIGS. 2 and 3. The invention is most effective at providing a uniform line exposure if the light emitting diodes 26a through 26x are energized for a finite length of time while the photosensitive material 14 is driven continuously past the line exposure array 12 thereby resulting in each exposed line being slightly blurred in the aforementioned manner to minimize the underexposed areas which would otherwise be visible between succeeding exposed lines. In addition, continuously moving the photosensitive material 14 relative to the line exposure array 12 during each finite period of energization of the light emitting diodes operates to fill in or expose the spaces between the spaced apart light emitting diodes 26.

Referring now to FIG. 5, there is shown an alternate arrangement for the trapezoidal shaped light emitting diodes 26a through 26x of FIG. 4 wherein alternate diodes are offset with respect to each other in a direction orthogonal to the longitudinal axis AA of the substrate by a distance equivalent to one exposed line. For this offset, it is required that the energization of alternate light emitting diodes be delayed by a time corresponding to the time required for the photosensitive material 14 to travel between succeeding raster lines.

Referring now to FIG. 6 there is shown a pattern of exposure of the photosensitive material 12 which would be provided by the line exposure array of FIG. 5 if the exposure were provided by a step and repeat process utilizing either a stepper motor for the motor 24 and energizing each light emitting diode 26a for a finite time at each incremental step or alternatively driving the photosensitive material 14 at a constant speed past the line exposure array 12 and energizing the LED's for only an instant at each incremental step corresponding to a discrete line exposure. Thus, it can be seen from FIG. 6 that for the first line exposure only the row of alternate diodes 26a through 26x-1 are energized to expose the areas as shown at 0. At the next incremental exposure all the light emitting diodes 26a through 26x are energized to expose the areas as shown at 1 in lines 1 and 2 with the alternate light emitting diodes 26b through 26x exposing the unexposed spaces between the areas exposed by the diodes 26a through 26x-1 during the immediately preceding line exposure operation. The photosensitive material 14 thereafter advances relative to the line exposure array 12, and all the light emitting diodes 26 are again energized to expose the trapezoidal areas as shown at 2 in lines 2 and 3 with the alternate light emitting diodes 26b through 26x exposing the unexposed areas previously exposed by the light emitting diodes 26a through 26x-1 in the immediately preceding line exposure operation. As is readily apparent, this process is continued exposing the entire area of the photosensitive material 14 in a tiled pattern which eliminates any underexposed areas attributable to the spacing between the light emitting diodes.

Although the movement of the line exposure array 12 of FIG. 5 relative to the photosensitive material 14 has been described in a manner as providing a step and repeat operation to expose the tiled pattern of FIG. 6, it will be well understood that the invention is by no means so limited and that the photosensitive material 14 may be moved continuously past the line exposure array 12 while the light emitting diodes are energized for finite periods of time during each line exposure resulting in the edge lines of the tiled pattern of FIG. 6 being blurred or unsharp. Such blurring or unsharpness between the edge lines of the tile pattern of FIG. 6 may be preferred for eliminating potential edge line artifacts which could result during the aforementioned step and repeat process if precise alignment between steps could not be maintained.

Although the trapezoidal configuration of FIGS. 4 and 5 are preferred, the invention is by no means so limited and other geometric configurations could be provided as shown by the hexagon-shaped light emitting diodes 40a through 40x of FIG. 7 and the parallelogramshaped light emitting diodes 42a through 42x of FIG. 8.

Other embodiments of the invention, including additions, subtractions, deletions and other modifications of the preferred disclosed embodiments of the invention will be obvious to those skilled in the art and are within the scope of the following claims.

What is claimed is:
1. A line exposure array comprising:
an elongated substrate; having a longitudinal axis and
a plurality of light emitting elements disposed in spaced apart relation along the longitudinal axis of said substrate, each of said light emitting elements being defined by two substantially parallel spaced apart edge lines extending generally in directions parallel to the longitudinal axis of said substrate and interconnected at respective ends thereof by skewed edge lines extending in directions generally oblique to the longitudinal axis of said substrate.
2. The line exposure array of claim 1 wherein said light emitting elements comprise light emitting diodes.
3. The line exposure array of claim 2 wherein at least portions of said skewed edge lines of adjacent light emitting diodes are arranged in substantially parallel spaced apart relation with respect to each other.
4. The line exposure array of claim 3 wherein said edge lines for each of said light emitting diodes are structured to define a trapezoid.

5. The line exposure array of claim 4 wherein each light emitting diode is offset with respect to its immediately adjacent diodes by a select distance in a direction orthogonal to the longitudinal center axis of said substrate.

6. In an electronic image recording apparatus responsive to an electrical signal input representative of a select image for recording that image by exposing a photosensitive material, said image recording apparatus comprising:

a line exposure array having a longitudinal axis and including a plurality of light emitting elements disposed in spaced apart relation along the longitudinal axis of said exposure array, each of said light emitting elements being defined by two substantially parallel spaced apart edge lines extending generally in directions parallel to the longitudinal axis of said line exposure array and interconnected at respective ends thereof by skewed edge lines extending in directions generally oblique to the longitudinal axis of said line exposure array; and means for holding said line exposure array in light exposing relationship across the photosensitive material and for effecting a relative displacement between said line exposure array and the photosensitive material in a direction transverse to the longitudinal axis of said exposure array to expose the entire surface of the photosensitive material.

7. The apparatus of claim 6 wherein said light emitting elements comprise light emitting diodes.

8. The apparatus of claim 7 wherein at least portions of said skewed edge lines of adjacent light emitting diodes are arranged in substantially parallel spaced apart relation with respect to each other.

9. The apparatus of claim 8 wherein said edge lines for each of said light emitting diodes are structured to define a trapezoid.

10. The apparatus of claim 8 wherein each light emitting diode is offset with respect to its immediately adjacent diodes by a select distance in a direction orthogonal to the longitudinal center axis of said substrate.

* * * * *